United States Patent
Tao et al.

(10) Patent No.: US 12,225,100 B2
(45) Date of Patent: Feb. 11, 2025

(54) SYSTEM, DEVICES AND/OR PROCESSES FOR EXECUTING SERVICE FUNCTIONS

(71) Applicant: Arm Limited, Cambridge (GB)

(72) Inventors: Zijin Tao, Shanghai (CN); Zaiping Bie, Shanghai (CN); Song Zhu, Shanghai (CN)

(73) Assignee: Arm Limited, Cambridge (GB)

( * ) Notice: Subject to any disclaimer, the term of this patent is extended or adjusted under 35 U.S.C. 154(b) by 212 days.

(21) Appl. No.: 17/697,767

(22) Filed: Mar. 17, 2022

(65) Prior Publication Data

US 2023/0300219 A1    Sep. 21, 2023

(51) Int. Cl.
*H04L 67/60* (2022.01)
*H04L 45/302* (2022.01)

(52) U.S. Cl.
CPC .......... *H04L 67/60* (2022.05); *H04L 45/306* (2013.01)

(58) Field of Classification Search
CPC ..... H04L 67/60; H04L 45/306; H04L 59/705; H04L 45/369; H04L 65/57
See application file for complete search history.

(56) References Cited

U.S. PATENT DOCUMENTS

| | | | |
|---|---|---|---|
| 2018/0262431 A1* | 9/2018 | Zhang | H04L 47/20 |
| 2019/0069195 A1* | 2/2019 | Makinen | H04W 28/0268 |
| 2019/0104076 A1* | 4/2019 | Seetharaman | H04L 45/64 |
| 2019/0327136 A1* | 10/2019 | Chatras | H04L 65/1073 |
| 2020/0195580 A1* | 6/2020 | Han | H04L 49/208 |
| 2021/0073750 A1* | 3/2021 | Ledford | G06Q 20/027 |
| 2023/0016351 A1* | 1/2023 | Liu | H04L 45/74 |
| 2023/0171183 A1* | 6/2023 | Liu | H04L 45/34 370/351 |
| 2023/0216775 A1* | 7/2023 | Xu | H04L 45/52 370/392 |

OTHER PUBLICATIONS

Farrel, "Service Function Chaining (SFC) An Overview and IETF Work," India Internet Engineering Society (IIESoc), Connections: A pre-IETF India Forum, Oct. 31-Nov. 1, 2018, 36 pages.
Onf, "L4-L7 Service Function Chaining Solution Architecture," Version 1.0, Jun. 14, 2015, https://opennetworking.org/wp-content/uploads/2014/10/L4-L7_Service_Function_Chaining_Solution_Architecture.pdf, 36 pages.
NSH MD Class Assignment, "Network Service Header (NSH) Parameters," https://www.iana.org/assignments/nsh/nsh.txt, Oct. 24, 2021, 3 pages.

(Continued)

*Primary Examiner* — Michael A Keller
*Assistant Examiner* — Thao D Duong
(74) *Attorney, Agent, or Firm* — Berkeley Law & Technology Group, LLP (57) ABSTRACT

Example methods, apparatuses, and/or articles of manufacture are disclosed that may be implemented, in whole or in part, using one or more computing devices to process requests to execute instance of service functions in a service function chain. In one particular implementation, a request to execute an instance of a second service function in a service function change may be initiated prior to completion of an execution of an instance of a first service function in the service function chain.

20 Claims, 8 Drawing Sheets

(56) References Cited

OTHER PUBLICATIONS

Quinn, et al., "Problem Statement for Service Function Chaining," Internet Engineering Task Force (IETF), ISSN: 2070-1721, Apr. 2015, https://datatracker.ietf.org/doc/rfc7498/, 14 pages.

Halpern, et al, "Service Function Chaining (SFC) Architecture,", Internet Engineering Task Force (IETF), ISSN: 2070-1721, Oct. 2015, https://datatracker.ietf.org/doc/rfc7665/, 32 pages.

Quinn, et al, "Network Service Header (NSH)," Internet Engineering Task Force (IETF), ISSN: 2070-1721, https://tools.ietf.org/id/draft-ietf-sfc-nsh-17.html, Jan. 2018, 40 pages.

\* cited by examiner

SYSTEM, DEVICES AND/OR PROCESSES FOR EXECUTING SERVICE FUNCTIONS

BACKGROUND

1. Field

The present disclosure relates generally to execution of service functions.

2. Information

Service function chains have provided a mechanism to efficiently process message traffic received by a cloud computing apparatus. Service function chains may enable redirection of message traffic through a set of predefined service functions such as, for example, firewall filtering, Intrusion Protection System (IPS) investigation. Such service function chains may enable an efficient improvement in security and/or Quality-of-Service (QoS) for cloud services, just to provide a couple of examples.

BRIEF DESCRIPTION OF THE DRAWINGS

Claimed subject matter is particularly pointed out and distinctly claimed in the concluding portion of the specification. However, both as to organization and/or method of operation, together with objects, features, and/or advantages thereof, it may best be understood by reference to the following detailed description if read with the accompanying drawings in which:

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents.

DETAILED DESCRIPTION

References throughout this specification to one implementation, an implementation, one embodiment, an embodiment, and/or the like means that a particular feature, structure, characteristic, and/or the like described in relation to a particular implementation and/or embodiment is included in at least one implementation and/or embodiment of claimed subject matter. Thus, appearances of such phrases, for example, in various places throughout this specification are not necessarily intended to refer to the same implementation and/or embodiment or to any one particular implementation and/or embodiment. Furthermore, it is to be understood that particular features, structures, characteristics, and/or the like described are capable of being combined in various ways in one or more implementations and/or embodiments and, therefore, are within intended claim scope. In general, of course, as has always been the case for the specification of a patent application, these and other issues have a potential to vary in a particular context of usage. In other words, throughout the disclosure, particular context of description and/or usage provides helpful guidance regarding reasonable inferences to be drawn; however, likewise, "in this context" in general without further qualification refers at least to the context of the present patent application.

According to an embodiment, a service function (SF) may be implemented as an executable entity to provide services to process incoming messages traversing a service function chain (SFC). In this context, a "service function" as referred herein means a network process capable of providing a value-added service to traffic flows. In a particular implementation, an SF may perform one or more associated function(s) at one or more OSI layers. Service functions may include, for example, firewall, DPI, NAT, HTTP Header Enrichment function, TCP optimizer, server load-balancer, IDS, WAN and/or application acceleration, IPS and/or NAT services, just to provide a few examples. In a particular example of a Network Function Virtualization (NFV), an SF may comprise a Virtual Network Function.

Further in this context, a "service function chain" as referred to herein, is to mean an ordered sequence of SFs to be traversed. According to an embodiment, receipt of one or more signal packets (e.g., at a cloud computing apparatus) may initiate execution of instances of SFs of an SFC to provide one or more desired services. In a particular implementation, execution of instances of SFs in a SFC may be managed, at least in part, by a service function forwarder (SFF). In this context, a "service function forwarder" as referred to herein means a computing entity and/or process to facilitate forwarding all or portions of received signal packets to SFs. According to an embodiment, an SFF may forward portions of a received signal packet to instances of SFs in an SFC based on and/or responsive to one or more parameters specified in a header of the received signal packet (e.g., an identifier of the SFC).

Figure 1:
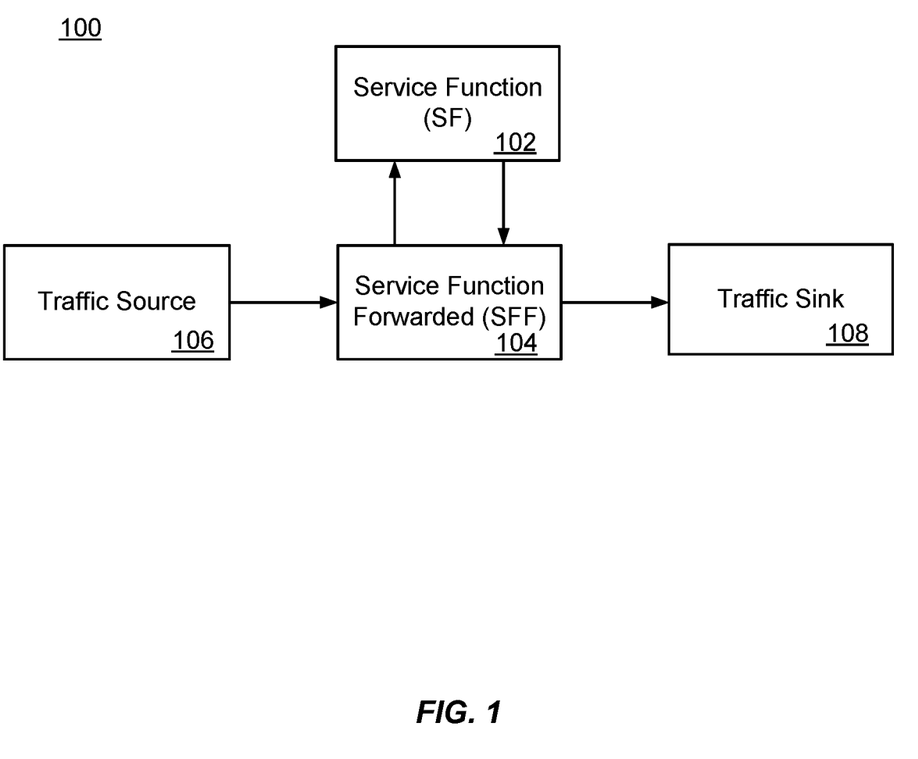
FIG. 1 is a block diagram illustrating interactions among entities to process requests to execute an instance of a service function, according to an embodiment.

As shown in FIG. 1, an SFF 104 may receive signal packets from a traffic source 106 (e.g., a router and/or edge server coupled to an electronic communication network). Based, at least in part, on parameters specified in a header of a received signal packet, SFF 104 may forward all or a portion of the received signal packet in one or more "request" messages to an instance of SF 102 for processing. As pointed out above, such an instance of SF 102 may be identified/specified by an SFC identified in parameters provided in a header in a signal packet received at traffic source 106. SF 102 may also initiate a response message to SFF 104 to, for example, confirm completion of execution of the requested instance of SF 102 and/or error messages, just to provide a couple of examples.

Figure 2:
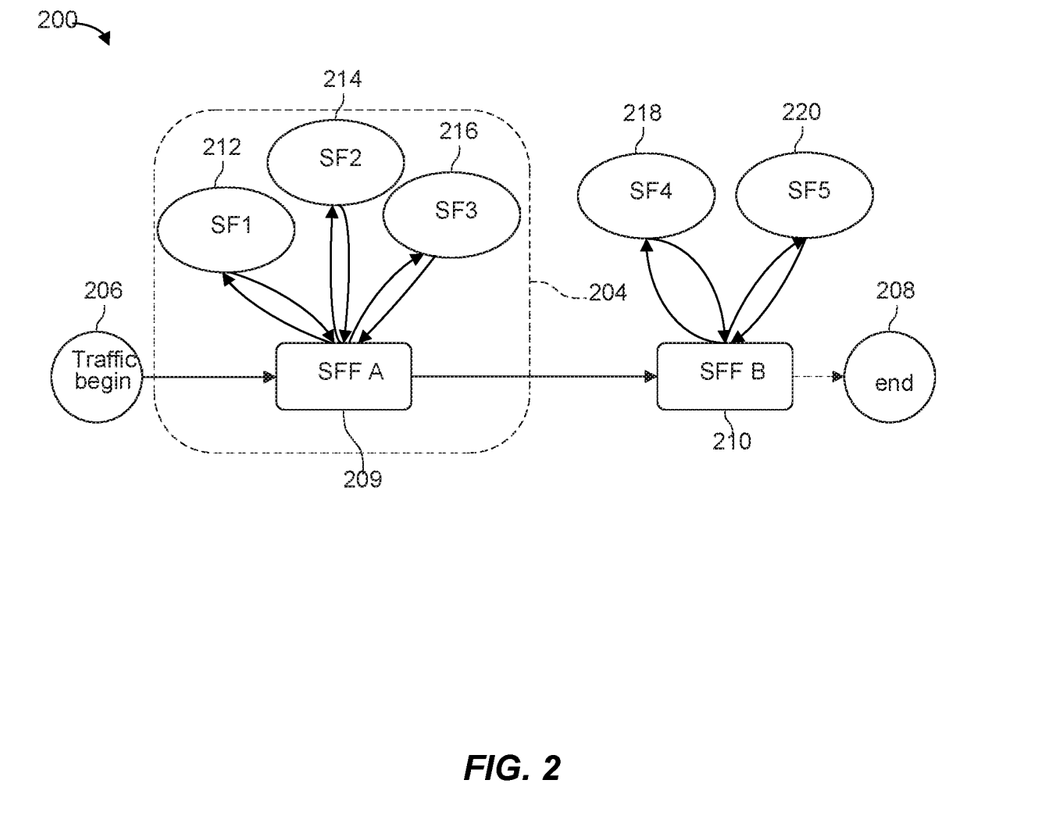
FIG. 2 is a block diagram illustrating interactions among entities to process requests to execute instances of one or more service functions of a service function chain, according to an embodiment.

FIG. 2 is a block diagram illustrating interactions among entities to process requests to execute instances of multiple SFs of an SFC, according to an embodiment. In the illustrated embodiment 200, an SFC may define an ordered sequence of SFs 212 (SF1), 214 (SF2), 216 (SF3), 218 (SF4) and 220 (SF5). Such an SFC may specify a service function path (SFP) including identification of a sequence of SFs in the SFC. Referencing an SFC, an SFP may optionally provide concrete descriptors of an SFC. In an embodiment, IETF defines an "SFC Encapsulation" that provides an SFP identification, and may be used by SFC-aware functions, such as an SFF and/or SFC-aware SFs. In addition to SFP identification, such an SFC Encapsulation may carry data plane context information, such as metadata.

According to an embodiment, an SFF may, following requesting execution of an instance of an SF in an SFC, wait for completion of execution of the instance of the SF prior to requesting execution of an instance of a subsequent SF in the SFC. For example, responsive to receipt of one or more signal packets, requesting execution of an SFC specifying SFs 212, 214, and 216, SFF 209 may request execution of an instance of SF 212, and wait for completion of execution of the instance of SF 212 (e.g., determined from receipt of a response message) before requesting execution of an instance of SF 214. Likewise, SFF 209 may wait for completion of execution of the instance of SF 214 before requesting execution of an instance of SF 216.

As pointed out above, SFs of an SFC may be applied to process a signal packet by application in a predefined order specified by the SFC, one SF after the other SF. According to an embodiment, it may be possible in some scenarios and/or applications to effectively process a signal packet by execution of instances of two or more SFs of an SFC concurrently and/or in parallel. For example, in particular SFC paths, some SFs execute complex and time intensive processes to check for traversal of a signal packet without any modification to the signal packet itself. Here, some signal packets may be predictive-forwarded/executed in subsequent SFs of an SFC while time intensive processing takes place in executing an instance of a previous SF. In one particular implementation, an SFF may predict an ability to execute of instances of two or more SFs of an SFC concurrently and/or in parallel based, at least in part, on previous execution/checking applied to packets having similar features (e.g., having the same metadata and/or specifying the same 5-tuple (src IP, dst IP, src Port, dst Port, Protocol)), and/or having the same hash value of a certain packet header or same hash value of an entire signal packet. Such execution of two or more SFs of an SFC concurrently and/or in parallel may enable shorter latencies (e.g., for application of the SFC) and/or improved utilization of computing resources. Unfortunately, a hard and fast rule implemented by an SFF to execute instances of SFs of an SFC one after the other in a predefined order may undercut the potential of obtaining shorter latencies and/or improved utilization of computing resources.

According to an embodiment, an SFF may, under particular circumstances permit concurrent execution of instances of two or more SFs of an SFC. For example, responsive to one or more signals received from a communication network, an SFF may initiate a request to execute an instance of a first SF in an SFC. The SFF may then, under particular circumstance, initiate a request to execute an instance of a subsequent SF in the SFC prior to receipt of a response to the request to execute the instance of the first service function. By enabling concurrent execution instances of multiple SFs in an SFC, lower latencies and improved utilization of computing resources may be achieved. In an embodiment, IETF RFC8300 may specify features to impose constraints to realize execution of SFs to be traversed in an SFP. A Network Service Header (NSH) may also enable an exchange of metadata exchange between entities along instantiated SFPs. In an implementation, such an NSH may provide an SFC encapsulation to support an SFC architecture defined according to IETF RFC 7665, for example. According to an embodiment, an SFF may incorporate features enabled by aspects of IETF RFC7665 (Service Function Chaining (SFC) Architecture) and/or RFC7498 (Problem Statement for Service Function Chaining), indicating that an implied order of SFs in an SFC need not be a linear progression by allowing for SFCs that copy to more than one branch.

Figure 3:
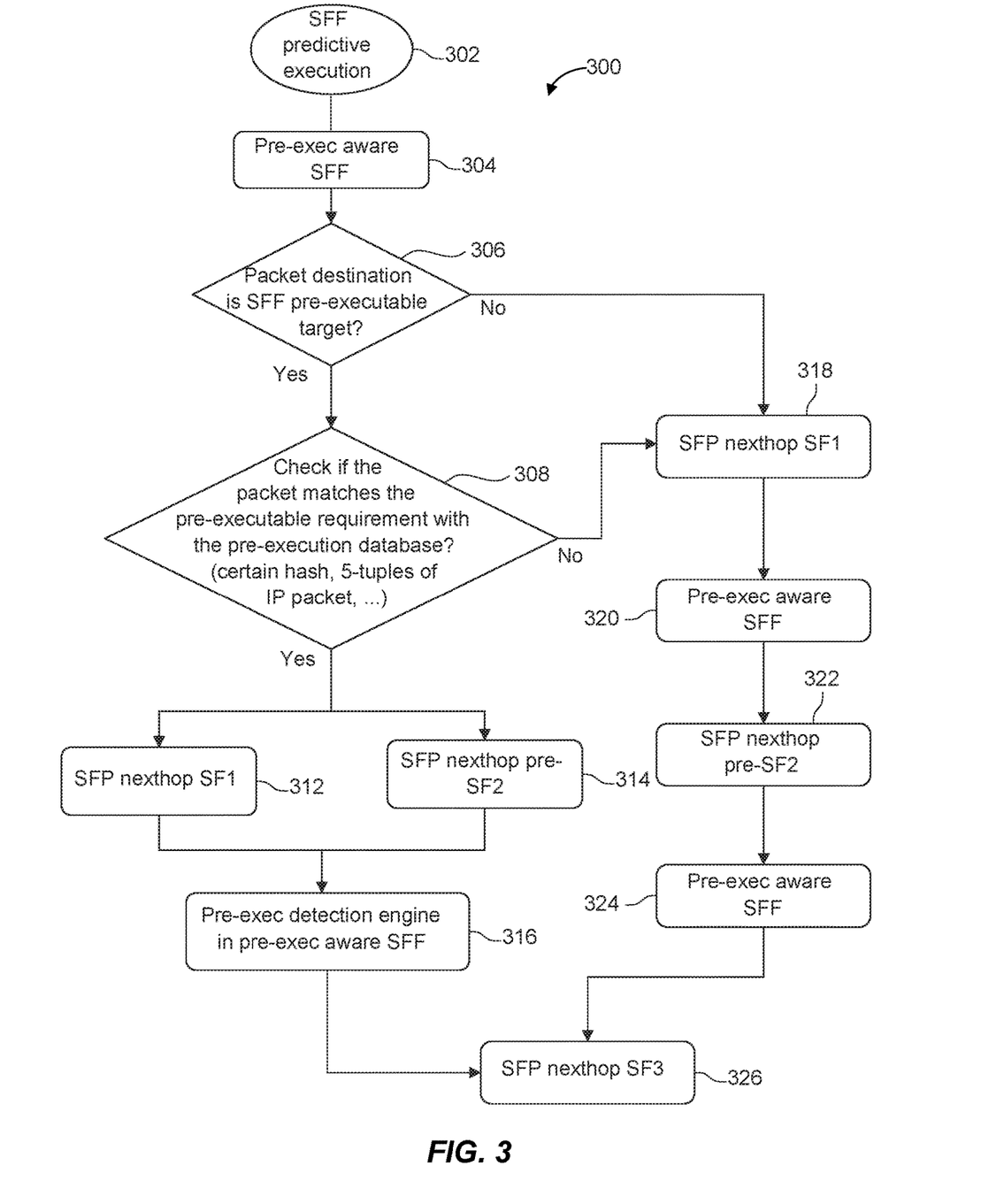
FIG. 3 is a flow diagram of a process to selectively request execution of an instance of a service function in a chain of service functions based, at least in part, on parameters specified in a received signal packet, according to an embodiment.

According to an embodiment, process 300 of FIG. 3 may be executed, at least in part, by a computing device to enable a predictive execution of a certain SF/SFs in an SFC. Process 300 may commence an SFF predictive execution at 302 responsive to an event such as, for example, receipt of a signal packet in message traffic from a communication network. Block 304 may comprise, for example, accessing a header portion of one or more signal packets to assess fields relating to a particular protocol. Such a header portion of one or more signal packets may be formatted according to features in FIGS. 4A and 4B as discussed herein. In one embodiment, a header portion accessed at block 304 may indicate that associated message traffic forwarded in the one or more signal packets is to be processed by execution of SFs in a particular SFC that is identifiable based, at least in part, on parameters specified in the accessed header portion. Such a header portion may indicate, for example, an identifier of such an SFC. Block 306 may assess whether such an SFC (identifiable the header portion) includes one or more SFs that are capable of being predictively executed (e.g., execution of an instance of an SF in the SFC may commence prior to completion of execution of an instance of a preceding SF in the SFC). In one particular implementation, block 306 may access a locally stored record that identifies SFCs and any SFs in such SFCs that may be predictively executed. As described herein, such a locally stored record may be determined and/or constructed based, at least in part, on a previous exchange of message in a process to "negotiate" capabilities of SFs. If diamond 306 determines that the second SF is not capable of being predictively executed, execution of instances of SFs in the SFC may commence in order in blocks 318 through 326.

Diamond 308 may be used to determine whether received message traffic (e.g., initiating execution of process 300) is of a type that may be processed by predictive execution of an SF in an SFC prior to completion of a preceding SF in the SFC. In a particular implementation, diamond 308 may evaluate features of the received message traffic such as, for example, one or more portions of a 5-tuple of a received signal packet (e.g., src IP, dst IP, src Port, dst Port, Protocol), or a hash of such parameters. If diamond 308 determines that received message traffic (e.g., initiating execution of process 300) is of a type that may be processed by predictive execution of an SF in an SFC prior to completion of a preceding SF in the SFC, an SFF may initiate concurrent execution of two SFs in an SFC at blocks 312 and 314. Otherwise, execution of instances of SFs in the SFC may commence in order in blocks 318 through 326.

Figure 4A:
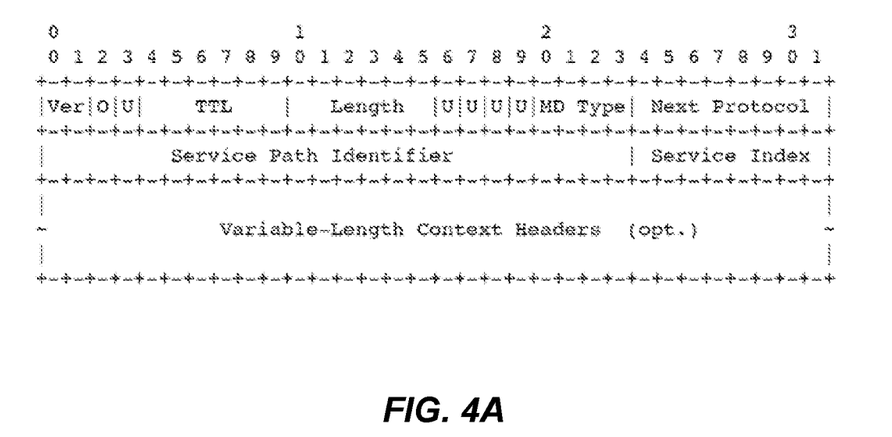
FIGS. 4A and 4B are formats of message headers of a signal packet, according to an embodiment.
Figure 4B:
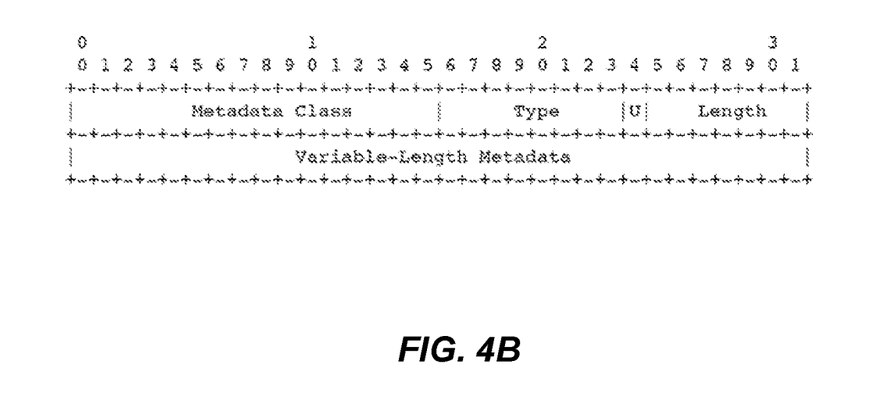

According to an embodiment, an SFF and instances of SFs in an SFC may communicate using an exchange of messages encapsulated in signal packets such as signal packets formatted according to a signal packet communication protocol. In an implementation, SFF 504 may enable and/or support "predictive execution" in that SF 504 may be capable of identifying conditions in which instances of SFs in an SFC may be executed concurrently. In one particular example implementation, an SFF and instance of SFs in an SFC may exchange signal packets containing items specified in a header organized according to a Network Service Header (NSH) format such as NSH with MD Type 0x2 as shown in FIG. 4A, as specified in IETF RFC8300, with an optional Variable-length context Header as shown in FIG. 4B. Such an exchange of signal packets may occur according to message flow diagram 500 (FIG. 5), illustrating an exchange of messages between an SFF 504 (that supports predictive execution of SF instances and/or concurrent execution of instances of SFs in an SFC) and SFs 512, 514 and 516. According to an embodiment, signal packets containing Request, Response, Pred Exec Request and Pred Response messages may include an NSH with Variable-length context Header as shown in FIG. 4B specifying particular parameters in "Metadata Class" and "Type" fields. Here, a reserved/unassigned value 0x0001-0x01FF may indicate an SFC predictive execution capability. Table 1 shows different values for a "Type" field to signal a particular message applicable to a protocol for predictive execution ("Length" field may be set to zero to specify that field "Variable-Length Metadata" is not used).

TABLE 1

| Type | Purpose |
|---|---|
| 0 | SFC Predictive Execution Capability Negotiation Request |
| 1 | SFC Predictive Execution Capability Negotiation Response: current negotiated capability not supported<br>Note: Please refer [0027] |
| 2 | SFC Predictive Execution Capability Negotiation Response: current negotiated capability supported and may need request revoke if false predicted |
| 3 | SFC Predictive Execution Capability Negotiation Response: current negotiated capability supported and does not need to be revoked if false predicted |
| 4 | Pred-Exec Req: SFC Request-Predictive Execution |
| 5 | Revoke Pred-Exec Req: SFC Request - Revoke Predictive Execution |
| 6 | Pred Rsp: SFC Response - Predictive Execution |

Figure 5:
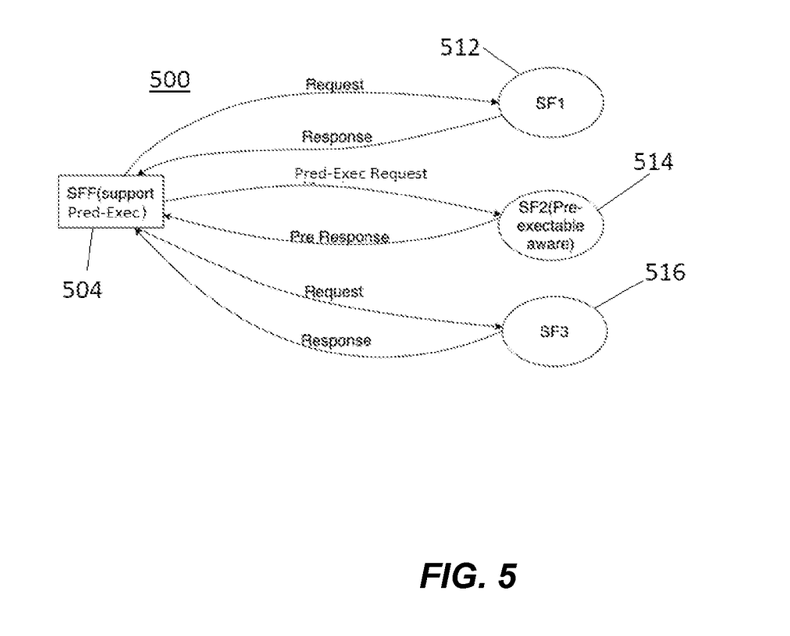
FIG. 5 is a message flow diagram illustrating messages between a service function forwarder and service functions of a service function chain according to an embodiment.

According to an embodiment, SFs 512, 514 and 516 may define at least a portion of an SFC to be invoked by SFF 504 wherein an associated SFP specifies execution of an instance of SF 512 initially, followed by execution of an instance of SF 514, then followed by execution of an instance of SF 516. SFF 504 may transmit signal packets to SFs 512 and 516 specifying a "Request" for executing associated instance of SFs 512 and 516 while SFs 512 and 516 may transmit signal packets to SFF 504 specifying a "Response" to, for example, indicate successful, unsuccessful or partially successful execution of associated SF instances. In a particular implementation, SFF 504 and SF 514 may be implemented to support predictive execution by, for example, being capable of encoding/transmitting and receiving/decoding signal packets having NSH Variable-Length Context Headers (e.g., specifying a "Type" field according to an encoding shown in Table 1).

According to an embodiment, SFF 504 may transmit a signal packet to an instance of SF 514 including a "Pred-Exec Request" message concurrently with transmission of a signal packet including a "Request" message to SF 512. Such a "Pred-Exec Request" message transmitted to an instance of SF 514 may include a value Type=4 in an NSH Variable-Length Context Header inquiring as to whether associated message traffic (e.g., to be processed by the instance of SF 514) may be "predictively executed" so as to be a subject of execution of the instance of SF 514 (e.g., commencing execution of an instance of SF 514 prior to completion of execution of an instance of SF 512). In response to receipt of such a "Pred-Exec Request" message, the instance of SF 514 may transmit a signal packet including a "Pred Response" message transmitted to SFF specifying a value Type=6 in an NSH Variable-Length Context Header. Such a value Type=6 may indicate that associated message traffic is to be processed by execution of the instance of SF 514 predictively (e.g., initiated prior to completion of execution of an instance of SF 512).

According to an embodiment, an SFF may negotiate capabilities with SFs in an SFC to, for example, enable predictive execution of SFs. Such a negotiation may be facilitated, at least in part, by an exchange of messages between and SFF and SFs in an SFC using signal packets having the aforementioned an NSH Variable-Length Context Header. For example, an SFF may transmit an SFC Predictive Execution Capability Negotiation Request signal packet to SF by specifying a value Type=0. Responsive to receipt of such an SFC Predictive Execution Capability Negotiation Request signal packet, an SF may evaluate its predictive execution capability and return a corresponding SFC Predictive Execution Capability Negotiation Response packet. Such an SFC Predictive Execution Capability Negotiation Response packet may take the form of a signal packet having an NSH Variable-Length Context Header specifying a value Type=1 if the SF does not support SFC predictive execution capability, 2) value Type=2 if the SF supports an SFC predictive execution capability with request revoked (SF can handle a false predictive execution request but needs SFF to send revoke request to it for false prediction) or 3) value Type=3 if the SF supports an SFC predictive execution capability invariably (the false prediction doesn't undermine SF's logic and no revoke predictive execution request is needed). In a particular implementation, following an exchange of messages with SFs in an SFC to determine predictive execution capabilities, an SFF may preserve the determined predictive execution capabilities in a local cache memory for use in processing future message traffic.

Figure 6:
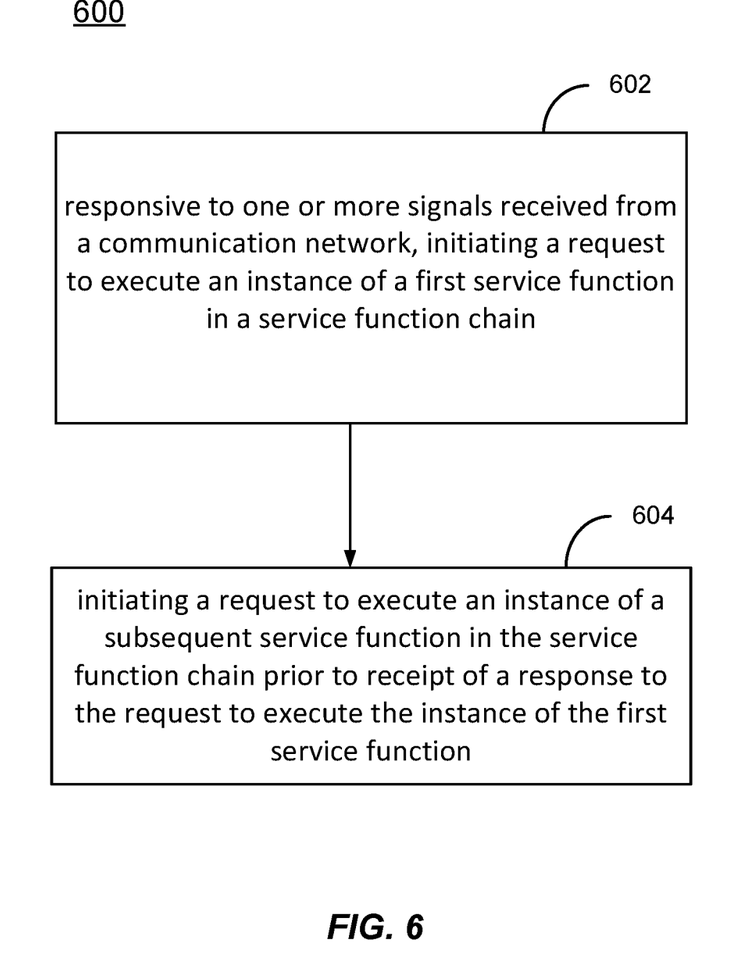
FIG. 6 is a flow diagram of a process to initiate requests to execute instance of a service functions in a service function chain, according to an embodiment.

FIG. 6 is a flow diagram of a process 600 to initiate requests to execute instance of a SFs in an SFC, according to an embodiment. Process 600 may be executed, at least in part, by a computing device to implement an SFF, for example. Execution of process 600 may be initiated, at least in part, responsive to receipt of one or more signal packets containing message traffic. At block 602, an SFF may initiate execution of an instance of a first SF in an SFC (e.g., an SFC identified in a header portion of a received signal packet received from a communication network). As pointed out above, execution of an instance of such a such a first SF in an SFC chain may be initiated, at least in part, by transmission of a signal packet containing "Request" message such as a signal packet transmitted by SFF 504 to SF 512 (FIG. 5). Block 604 may comprise initiation of an instance of a second SF in the SFC prior to completion of execution of the instance of the first SF initiated at block 602. In one implementation, block 604 may comprise transmission of a signal packet containing a "Pred Exec Request" message from SFF 504 to SF 514 prior to receipt of a "Response" message from SF 512. In another implementation, blocks 602 and 604 may comprise initiation of concurrent execution of SFs in an SFC as shown in blocks 312 and 314 (FIG. 3).

Figure 7:
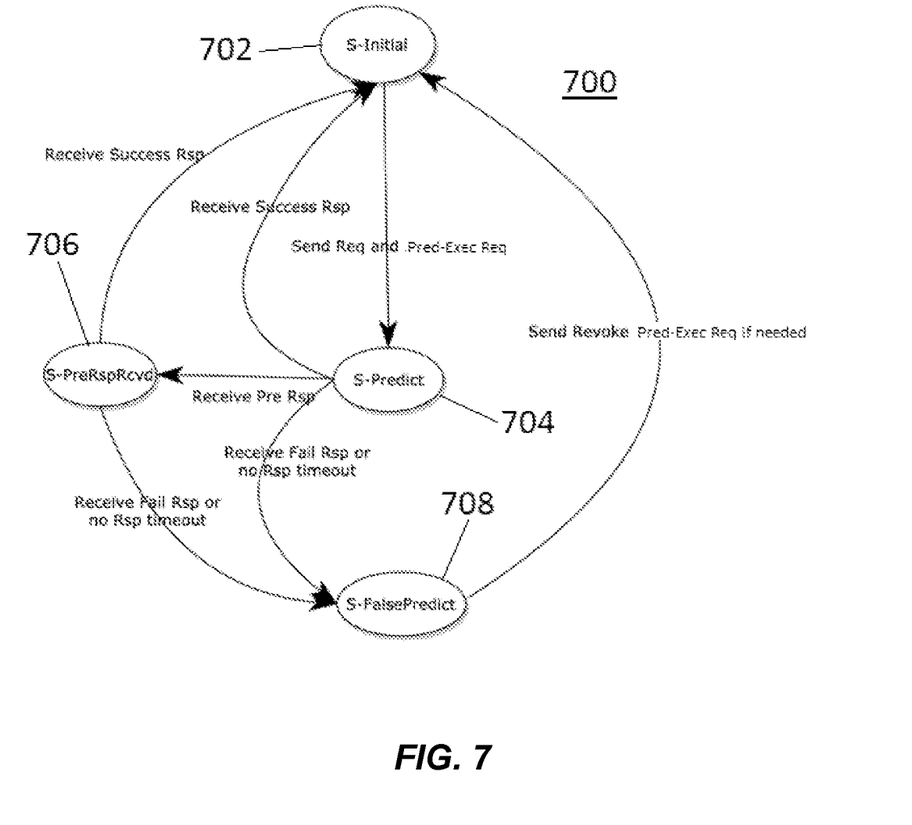
FIG. 7 is a state transition diagram depicting different operational states of service function forwarder, according to an embodiment.

In communicating with an SF in an SFC that is capable of supporting predictive execution (e.g., as determined based on an exchange of messages as discussed above), an SFF may transition to different state as illustrated in FIG. 7 according to an embodiment. From an initial state 702, an SFF may transmit signal packets to first and second SFs in an SPC including a Request message to the first SF and a Pred-Exec Request message to the second SF to transition to state 704 if it has been determined that the second SF is capable of supporting SPC prediction (e.g., determined at diamond 306, FIG. 3) and received message traffic includes attributes indicating suitability for application of predictive execution of the second SF (e.g., determined at block 308, FIG. 3). Otherwise, if it is determined that the second SF is not capable of supporting SPC predictive execution or that received message traffic is not suitable for predictive execution of the second SF, a transition from state 702 to state 704 may comprise transmission of a "Request" message to the first SF without transmission of a "Pred-Exec Request" message to the second SF. If while in state 704 an SFF receives a Pred Response message from the second SF, the SFF may transition to state 706. If the Pred Response message indicates that the second SF successfully executed, the SFF may transition from state 704 or state 706 to initial state 702. Otherwise, if the Pred Response message indicates that the second SF did not successfully execute or if an allowed time for a response expires, the SFF may transition from state 704 or 706 to state 708. In a transition from state 708 to state 702, an SFF may initiate transmission of a signal packet including a message to revoke a "Pred-Exec Request" message (e.g., in an NHS specifying a value Type=5).

In the context of the present patent application, the term "connection," the term "component" and/or similar terms are intended to be physical but are not necessarily always tangible. Whether or not these terms refer to tangible subject matter, thus, may vary in a particular context of usage. As an example, a tangible connection and/or tangible connection path may be made, such as by a tangible, electrical connection, such as an electrically conductive path comprising metal or other conductor, that is able to conduct electrical current between two tangible components. Likewise, a tangible connection path may be at least partially affected and/or controlled, such that, as is typical, a tangible connection path may be open or closed, at times resulting from influence of one or more externally derived signals, such as external currents and/or voltages, such as for an electrical switch. Non-limiting illustrations of an electrical switch include a transistor, a diode, etc. However, a "connection" and/or "component," in a particular context of usage, likewise, although physical, can also be non-tangible, such as a connection between a client and a server over a network, particularly a wireless network, which generally refers to the ability for the client and server to transmit, receive, and/or exchange communications, as discussed in more detail later.

In a particular context of usage, such as a particular context in which tangible components are being discussed, therefore, the terms "coupled" and "connected" are used in a manner so that the terms are not synonymous. Similar terms may also be used in a manner in which a similar intention is exhibited. Thus, "connected" is used to indicate that two or more tangible components and/or the like, for example, are tangibly in direct physical contact. Thus, using the previous example, two tangible components that are electrically connected are physically connected via a tangible electrical connection, as previously discussed. However, "coupled," is used to mean that potentially two or more tangible components are tangibly in direct physical contact. Nonetheless, "coupled" is also used to mean that two or more tangible components and/or the like are not necessarily tangibly in direct physical contact, but are able to cooperate, liaise, and/or interact, such as, for example, by being "optically coupled." Likewise, the term "coupled" is also understood to mean indirectly connected. It is further noted, in the context of the present patent application, since memory, such as a memory component and/or memory states, is intended to be non-transitory, the term physical, at least if used in relation to memory necessarily implies that such memory components and/or memory states, continuing with the example, are tangible.

Unless otherwise indicated, in the context of the present patent application, the term "or" if used to associate a list, such as A, B, or C, is intended to mean A, B, and C, here used in the inclusive sense, as well as A, B, or C, here used in the exclusive sense. With this understanding, "and" is used in the inclusive sense and intended to mean A, B, and C; whereas "and/or" can be used in an abundance of caution to make clear that all of the foregoing meanings are intended, although such usage is not required. In addition, the term "one or more" and/or similar terms is used to describe any feature, structure, characteristic, and/or the like in the singular, "and/or" is also used to describe a plurality and/or some other combination of features, structures, characteristics, and/or the like. Likewise, the term "based on" and/or similar terms are understood as not necessarily intending to convey an exhaustive list of factors, but to allow for existence of additional factors not necessarily expressly described.

Furthermore, it is intended, for a situation that relates to implementation of claimed subject matter and is subject to testing, measurement, and/or specification regarding degree, that the particular situation be understood in the following manner. As an example, in a given situation, assume a value of a physical property is to be measured. If alternatively reasonable approaches to testing, measurement, and/or specification regarding degree, at least with respect to the property, continuing with the example, is reasonably likely to occur to one of ordinary skill, at least for implementation purposes, claimed subject matter is intended to cover those alternatively reasonable approaches unless otherwise expressly indicated. As an example, if a plot of measurements over a region is produced and implementation of claimed subject matter refers to employing a measurement of slope over the region, but a variety of reasonable and alternative techniques to estimate the slope over that region exist, claimed subject matter is intended to cover those reasonable alternative techniques unless otherwise expressly indicated.

To the extent claimed subject matter is related to one or more particular measurements, such as with regard to physical manifestations capable of being measured physically, such as, without limit, temperature, pressure, voltage, current, electromagnetic radiation, etc., it is believed that claimed subject matter does not fall with the abstract idea judicial exception to statutory subject matter. Rather, it is asserted, that physical measurements are not mental steps and, likewise, are not abstract ideas.

It is noted, nonetheless, that a typical measurement model employed is that one or more measurements may respectively comprise a sum of at least two components. Thus, for a given measurement, for example, one component may comprise a deterministic component, which in an ideal sense, may comprise a physical value (e.g., sought via one or more measurements), often in the form of one or more signals, signal samples and/or states, and one component may comprise a random component, which may have a variety of sources that may be challenging to quantify. At times, for example, lack of measurement precision may affect a given measurement. Thus, for claimed subject matter, a statistical or stochastic model may be used in addition to a deterministic model as an approach to identification and/or prediction regarding one or more measurement values that may relate to claimed subject matter.

For example, a relatively large number of measurements may be collected to better estimate a deterministic component. Likewise, if measurements vary, which may typically occur, it may be that some portion of a variance may be explained as a deterministic component, while some portion of a variance may be explained as a random component. Typically, it is desirable to have stochastic variance associated with measurements be relatively small, if feasible. That is, typically, it may be preferable to be able to account for a reasonable portion of measurement variation in a deterministic manner, rather than a stochastic matter as an aid to identification and/or predictability.

Along these lines, a variety of techniques have come into use so that one or more measurements may be processed to better estimate an underlying deterministic component, as well as to estimate potentially random components. These techniques, of course, may vary with details surrounding a given situation. Typically, however, more complex problems may involve use of more complex techniques. In this regard, as alluded to above, one or more measurements of physical manifestations may be modelled deterministically and/or stochastically. Employing a model permits collected measurements to potentially be identified and/or processed, and/or potentially permits estimation and/or prediction of an underlying deterministic component, for example, with respect to later measurements to be taken. A given estimate may not be a perfect estimate; however, in general, it is expected that on average one or more estimates may better reflect an underlying deterministic component, for example, if random components that may be included in one or more obtained measurements, are considered. Practically speaking, of course, it is desirable to be able to generate, such as through estimation approaches, a physically meaningful model of processes affecting measurements to be taken.

In some situations, however, as indicated, potential influences may be complex. Therefore, seeking to understand appropriate factors to consider may be particularly challenging. In such situations, it is, therefore, not unusual to employ heuristics with respect to generating one or more estimates. Heuristics refers to use of experience related approaches that may reflect realized processes and/or realized results, such as with respect to use of historical measurements, for example. Heuristics, for example, may be employed in situations where more analytical approaches may be overly complex and/or nearly intractable. Thus, regarding claimed subject matter, an innovative feature may include, in an example embodiment, heuristics that may be employed, for example, to estimate and/or predict one or more measurements.

It is further noted that the terms "type" and/or "like," if used, such as with a feature, structure, characteristic, and/or the like, using "optical" or "electrical" as simple examples, means at least partially of and/or relating to the feature, structure, characteristic, and/or the like in such a way that presence of minor variations, even variations that might otherwise not be considered fully consistent with the feature, structure, characteristic, and/or the like, do not in general prevent the feature, structure, characteristic, and/or the like from being of a "type" and/or being "like," (such as being an "optical-type" or being "optical-like," for example) if the minor variations are sufficiently minor so that the feature, structure, characteristic, and/or the like would still be considered to be substantially present with such variations also present. Thus, continuing with this example, the terms optical-type and/or optical-like properties are necessarily intended to include optical properties. Likewise, the terms electrical-type and/or electrical-like properties, as another example, are necessarily intended to include electrical properties. It should be noted that the specification of the present patent application merely provides one or more illustrative examples and claimed subject matter is intended to not be limited to one or more illustrative examples; however, again, as has always been the case with respect to the specification of a patent application, particular context of description and/or usage provides helpful guidance regarding reasonable inferences to be drawn.

The term electronic file and/or the term electronic document are used throughout this document to refer to a set of stored memory states and/or a set of physical signals associated in a manner so as to thereby at least logically form a file (e.g., electronic) and/or an electronic document. That is, it is not meant to implicitly reference a particular syntax, format and/or approach used, for example, with respect to a set of associated memory states and/or a set of associated physical signals. If a particular type of file storage format and/or syntax, for example, is intended, it is referenced expressly. It is further noted an association of memory states, for example, may be in a logical sense and not necessarily in a tangible, physical sense. Thus, although signal and/or state components of a file and/or an electronic document, for example, are to be associated logically, storage thereof, for example, may reside in one or more different places in a tangible, physical memory, in an embodiment.

A Hyper Text Markup Language ("HTML"), for example, may be utilized to specify digital content and/or to specify a format thereof, such as in the form of an electronic file and/or an electronic document, such as a Web page, Web site, etc., for example. An Extensible Markup Language ("XML") may also be utilized to specify digital content and/or to specify a format thereof, such as in the form of an electronic file and/or an electronic document, such as a Web page, Web site, etc., in an embodiment. Of course, HTML and/or XML are merely examples of "markup" languages, provided as non-limiting illustrations. Furthermore, HTML and/or XML are intended to refer to any version, now known and/or to be later developed, of these languages. Likewise, claimed subject matter are not intended to be limited to examples provided as illustrations, of course.

In the context of the present patent application, the terms "entry," "electronic entry," "document," "electronic document," "content", "digital content," "item," and/or similar terms are meant to refer to signals and/or states in a physical format, such as a digital signal and/or digital state format, e.g., that may be perceived by a user if displayed, played, tactilely generated, etc. and/or otherwise executed by a device, such as a digital device, including, for example, a computing device, but otherwise might not necessarily be readily perceivable by humans (e.g., if in a digital format). Likewise, in the context of the present patent application, digital content provided to a user in a form so that the user is able to readily perceive the underlying content itself (e.g., content presented in a form consumable by a human, such as hearing audio, feeling tactile sensations and/or seeing images, as examples) is referred to, with respect to the user, as "consuming" digital content, "consumption" of digital content, "consumable" digital content and/or similar terms. For one or more embodiments, an electronic document and/or an electronic file may comprise a Web page of code (e.g., computer instructions) in a markup language executed or to be executed by a computing and/or networking device, for example. In another embodiment, an electronic document and/or electronic file may comprise a portion and/or a region of a Web page. However, claimed subject matter is not intended to be limited in these respects.

Also, for one or more embodiments, an electronic document and/or electronic file may comprise a number of components. As previously indicated, in the context of the present patent application, a component is physical, but is not necessarily tangible. As an example, components with reference to an electronic document and/or electronic file, in one or more embodiments, may comprise text, for example, in the form of physical signals and/or physical states (e.g., capable of being physically displayed). Typically, memory states, for example, comprise tangible components, whereas physical signals are not necessarily tangible, although signals may become (e.g., be made) tangible, such as if appearing on a tangible display, for example, as is not uncommon. Also, for one or more embodiments, components with reference to an electronic document and/or electronic file may comprise a graphical object, such as, for example, an image, such as a digital image, and/or sub-objects, including attributes thereof, which, again, comprise physical signals and/or physical states (e.g., capable of being tangibly displayed). In an embodiment, digital content may comprise, for example, text, images, audio, video, and/or other types of electronic documents and/or electronic files, including portions thereof, for example.

Also, in the context of the present patent application, the term "parameters" (e.g., one or more parameters), "values" (e.g., one or more values), "symbols" (e.g., one or more symbols) "bits" (e.g., one or more bits), "elements" (e.g., one or more elements), "characters" (e.g., one or more characters), "numbers" (e.g., one or more numbers), "numerals" (e.g., one or more numerals) or "measurements" (e.g., one or more measurements) refer to material descriptive of a collection of signals, such as in one or more electronic documents and/or electronic files, and exist in the form of physical signals and/or physical states, such as memory states. For example, one or more parameters, values, symbols, bits, elements, characters, numbers, numerals or measurements, such as referring to one or more aspects of an electronic document and/or an electronic file comprising an image, may include, as examples, time of day at which an image was captured, latitude and longitude of an image capture device, such as a camera, for example, etc. In another example, one or more parameters, values, symbols, bits, elements, characters, numbers, numerals or measurements, relevant to digital content, such as digital content comprising a technical article, as an example, may include one or more authors, for example. Claimed subject matter is intended to embrace meaningful, descriptive parameters, values, symbols, bits, elements, characters, numbers, numerals or measurements in any format, so long as the one or more parameters, values, symbols, bits, elements, characters, numbers, numerals or measurements comprise physical signals and/or states, which may include, as parameter, value, symbol bits, elements, characters, numbers, numerals or measurements examples, collection name (e.g., electronic file and/or electronic document identifier name), technique of creation, purpose of creation, time and date of creation, logical path if stored, coding formats (e.g., type of computer instructions, such as a markup language) and/or standards and/or specifications used so as to be protocol compliant (e.g., meaning substantially compliant and/or substantially compatible) for one or more uses, and so forth.

Signal packet communications and/or signal frame communications, also referred to as signal packet transmissions and/or signal frame transmissions (or merely "signal packets" or "signal frames"), may be communicated between nodes of a network, where a node may comprise one or more network devices and/or one or more computing devices, for example. As an illustrative example, but without limitation, a node may comprise one or more sites employing a local network address, such as in a local network address space. Likewise, a device, such as a network device and/or a computing device, may be associated with that node. It is also noted that in the context of this patent application, the term "transmission" is intended as another term for a type of signal communication that may occur in any one of a variety of situations. Thus, it is not intended to imply a particular directionality of communication and/or a particular initiating end of a communication path for the "transmission" communication. For example, the mere use of the term in and of itself is not intended, in the context of the present patent application, to have particular implications with respect to the one or more signals being communicated, such as, for example, whether the signals are being communicated "to" a particular device, whether the signals are being communicated "from" a particular device, and/or regarding which end of a communication path may be initiating communication, such as, for example, in a "push type" of signal transfer or in a "pull type" of signal transfer. In the context of the present patent application, push and/or pull type signal transfers are distinguished by which end of a communications path initiates signal transfer.

Thus, a signal packet and/or frame may, as an example, be communicated via a communication channel and/or a communication path, such as comprising a portion of the Internet and/or the Web, from a site via an access node coupled to the Internet or vice-versa. Likewise, a signal packet and/or frame may be forwarded via network nodes to a target site coupled to a local network, for example. A signal packet and/or frame communicated via the Internet and/or the Web, for example, may be routed via a path, such as either being "pushed" or "pulled," comprising one or more gateways, servers, etc. that may, for example, route a signal packet and/or frame, such as, for example, substantially in accordance with a target and/or destination address and availability of a network path of network nodes to the target and/or destination address. Although the Internet and/or the Web comprise a network of interoperable networks, not all of those interoperable networks are necessarily available and/or accessible to the public. According to an embodiment, a signal packet and/or frame may comprise all or a portion of a "message" transmitted between devices. In an implementation, a message may comprise signals and/or states expressing content to be delivered to a recipient device. For example, a message may at least in part comprise a physical signal in a transmission medium that is modulated by content that is to be stored in a non-transitory storage medium at a recipient device, and subsequently processed.

In the context of the particular patent application, a network protocol, such as for communicating between devices of a network, may be characterized, at least in part, substantially in accordance with a layered description, such as the so-called Open Systems Interconnection (OSI) seven layer type of approach and/or description. A network computing and/or communications protocol (also referred to as a network protocol) refers to a set of signaling conventions, such as for communication transmissions, for example, as may take place between and/or among devices in a network. In the context of the present patent application, the term "between" and/or similar terms are understood to include "among" if appropriate for the particular usage and vice-versa. Likewise, in the context of the present patent application, the terms "compatible with," "comply with" and/or similar terms are understood to respectively include substantial compatibility and/or substantial compliance.

A network protocol, such as protocols characterized substantially in accordance with the aforementioned OSI description, has several layers. These layers are referred to as a network stack. Various types of communications (e.g., transmissions), such as network communications, may occur across various layers. A lowest level layer in a network stack, such as the so-called physical layer, may characterize how symbols (e.g., bits and/or bytes) are communicated as one or more signals (and/or signal samples) via a physical medium (e.g., twisted pair copper wire, coaxial cable, fiber optic cable, wireless air interface, combinations thereof, etc.). Progressing to higher-level layers in a network protocol stack, additional operations and/or features may be available via engaging in communications that are substantially compatible and/or substantially compliant with a particular network protocol at these higher-level layers. For example, higher-level layers of a network protocol may, for example, affect device permissions, user permissions, etc.

Figure 8:
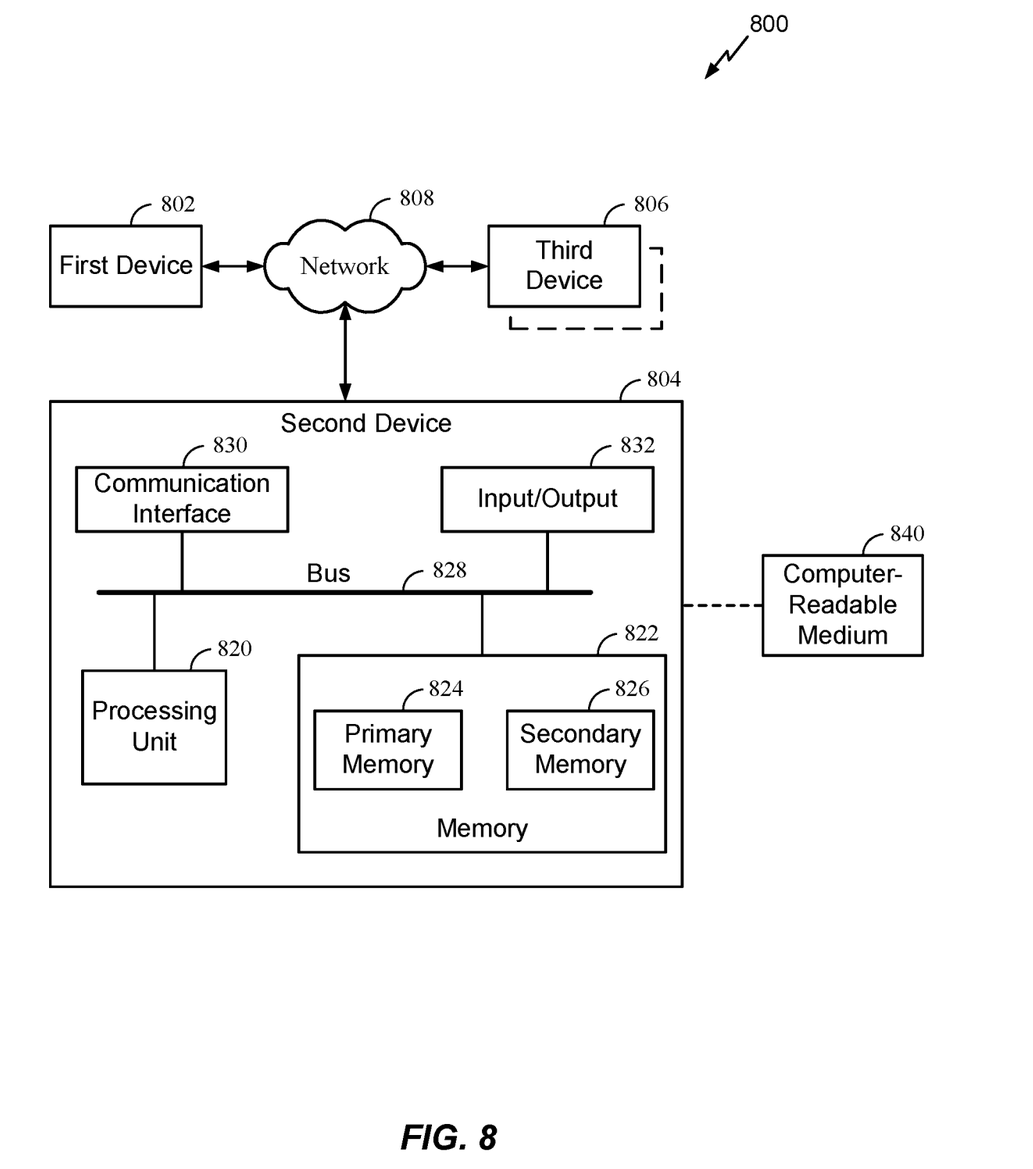
FIG. 8 is a schematic block diagram of an example computing system in accordance with an implementation.

In one example embodiment, as shown in FIG. 8, a system embodiment may comprise a local network (e.g., device 804 and medium 840) and/or another type of network, such as a computing and/or communications network. For purposes of illustration, therefore, FIG. 8 shows an embodiment 800 of a system that may be employed to implement either type or both types of networks. Network 808 may comprise one or more network connections, links, processes, services, applications, and/or resources to facilitate and/or support communications, such as an exchange of communication signals, for example, between a computing device, such as 802, and another computing device, such as 806, which may, for example, comprise one or more client computing devices and/or one or more server computing device. By way of example, but not limitation, network 808 may comprise wireless and/or wired communication links, telephone and/or telecommunications systems, Wi-Fi networks, Wi-MAX networks, the Internet, a local area network (LAN), a wide area network (WAN), or any combinations thereof.

Example devices in FIG. 8 may comprise features, for example, of a client computing device and/or a server computing device, in an embodiment. It is further noted that the term computing device, in general, whether employed as a client and/or as a server, or otherwise, refers at least to a processor and a memory connected by a communication bus. A "processor" and/or "processing circuit" for example, is understood to connote a specific structure such as a central processing unit (CPU), digital signal processor (DSP), graphics processing unit (GPU) and/or neural network processing unit (NPU), or a combination thereof, of a computing device which may include a control unit and an execution unit. In an aspect, a processor and/or processing circuit may comprise a device that fetches, interprets and executes instructions to process input signals to provide output signals. As such, in the context of the present patent application at least, this is understood to refer to sufficient structure within the meaning of 35 USC § 112 (f) so that it is specifically intended that 35 USC § 112 (f) not be implicated by use of the term "computing device," "processor," "processing unit," "processing circuit" and/or similar terms; however, if it is determined, for some reason not immediately apparent, that the foregoing understanding cannot stand and that 35 USC § 112 (f), therefore, necessarily is implicated by the use of the term "computing device" and/or similar terms, then, it is intended, pursuant to that statutory section, that corresponding structure, material and/or acts for performing one or more functions be understood and be interpreted to be described at least in FIGS. 1 through 7 and in the text associated with the foregoing figure(s) of the present patent application.

Referring now to FIG. 8, in an embodiment, first and third devices 802 and 806 may be capable of rendering a graphical user interface (GUI) for a network device and/or a computing device, for example, so that a user-operator may engage in system use. Device 804 may potentially serve a similar function in this illustration. Likewise, in FIG. 8, computing device 802 ('first device' in figure) may interface with computing device 804 ('second device' in figure), which may, for example, also comprise features of a client computing device and/or a server computing device, in an embodiment. Processor (e.g., processing device) 820 and memory 822, which may comprise primary memory 824 and secondary memory 826, may communicate by way of a communication bus 815, for example. The term "computing device," in the context of the present patent application, refers to a system and/or a device, such as a computing apparatus, that includes a capability to process (e.g., perform computations) and/or store digital content, such as electronic files, electronic documents, measurements, text, images, video, audio, etc. in the form of signals and/or states. Thus, a computing device, in the context of the present patent application, may comprise hardware, software, firmware, or any combination thereof (other than software per se). Computing device 804, as depicted in FIG. 8, is merely one example, and claimed subject matter is not limited in scope to this particular example. FIG. 8 may further comprise a communication interface 830 which may comprise circuitry and/or devices to facilitate transmission of messages between second device 804 and first device 802 and/or third device 806 in a physical transmission medium over network 808 using one or more network communication techniques identified herein, for example. In a particular implementation, communication interface 830 may comprise a transmitter device including devices and/or circuitry to modulate a physical signal in physical transmission medium according to a particular communication format based, at least in part, on a message that is intended for receipt by one or more recipient devices. Similarly, communication interface 830 may comprise a receiver device comprising devices and/or circuitry demodulate a physical signal in a physical transmission medium to, at least in part, recover at least a portion of a message used to modulate the physical signal according to a particular communication format. In a particular implementation, communication interface may comprise a transceiver device having circuitry to implement a receiver device and transmitter device.

For one or more embodiments, a device, such as a computing device and/or networking device, may comprise, for example, any of a wide range of digital electronic devices, including, but not limited to, desktop and/or notebook computers, high-definition televisions, digital versatile disc (DVD) and/or other optical disc players and/or recorders, game consoles, satellite television receivers, cellular telephones, tablet devices, wearable devices, personal digital assistants, mobile audio and/or video playback and/or recording devices, Internet of Things (IoT) type devices, or any combination of the foregoing. Further, unless specifically stated otherwise, a process as described, such as with reference to flow diagrams and/or otherwise, may also be executed and/or affected, in whole or in part, by a computing device and/or a network device. A device, such as a computing device and/or network device, may vary in terms of capabilities and/or features. Claimed subject matter is intended to cover a wide range of potential variations. For example, a device may include a numeric keypad and/or other display of limited functionality, such as a monochrome liquid crystal display (LCD) for displaying text, for example. In contrast, however, as another example, a web-enabled device may include a physical and/or a virtual keyboard, mass storage, one or more accelerometers, one or more gyroscopes, GNSS receiver and/or other location-identifying type capability, and/or a display with a higher degree of functionality, such as a touch-sensitive color 5D or 3D display, for example.

In FIG. 8, computing device 802 may provide one or more sources of executable computer instructions in the form physical states and/or signals (e.g., stored in memory states), for example. Computing device 802 may communicate with computing device 804 by way of a network connection, such as via network 808, for example. As previously mentioned, a connection, while physical, may not necessarily be tangible. Although computing device 804 of FIG. 8 shows various tangible, physical components, claimed subject matter is not limited to a computing devices having only these tangible components as other implementations and/or embodiments may include alternative arrangements that may comprise additional tangible components or fewer tangible components, for example, that function differently while achieving similar results. Rather, examples are provided merely as illustrations. It is not intended that claimed subject matter be limited in scope to illustrative examples.

Memory 822 may comprise any non-transitory storage mechanism. Memory 822 may comprise, for example, primary memory 824 and secondary memory 826, additional memory circuits, mechanisms, or combinations thereof may be used. Memory 822 may comprise, for example, random access memory, read only memory, etc., such as in the form of one or more storage devices and/or systems, such as, for example, a disk drive including an optical disc drive, a tape drive, a solid-state memory drive, etc., just to name a few examples.

Memory 822 may be utilized to store a program of executable computer instructions. For example, processor 820 may fetch executable instructions from memory and proceed to execute the fetched instructions. Memory 822 may also comprise a memory controller for accessing device readable-medium 840 that may carry and/or make accessible digital content, which may include code, and/or instructions, for example, executable by processor 820 and/or some other device, such as a controller, as one example, capable of executing computer instructions, for example. Under direction of processor 820, a non-transitory memory, such as memory cells storing physical states (e.g., memory states), comprising, for example, a program of executable computer instructions, may be executed by processor 820 and able to generate signals to be communicated via a network, for example, as previously described. Generated signals may also be stored in memory, also previously suggested.

Memory 822 may store electronic files and/or electronic documents, such as relating to one or more users, and may also comprise a computer-readable medium that may carry and/or make accessible content, including code and/or instructions, for example, executable by processor 820 and/or some other device, such as a controller, as one example, capable of executing computer instructions, for example. As previously mentioned, the term electronic file and/or the term electronic document are used throughout this document to refer to a set of stored memory states and/or a set of physical signals associated in a manner so as to thereby form an electronic file and/or an electronic document. That is, it is not meant to implicitly reference a particular syntax, format and/or approach used, for example, with respect to a set of associated memory states and/or a set of associated physical signals. It is further noted an association of memory states, for example, may be in a logical sense and not necessarily in a tangible, physical sense. Thus, although signal and/or state components of an electronic file and/or electronic document, are to be associated logically, storage thereof, for example, may reside in one or more different places in a tangible, physical memory, in an embodiment.

Algorithmic descriptions and/or symbolic representations are examples of techniques used by those of ordinary skill in the signal processing and/or related arts to convey the substance of their work to others skilled in the art. An algorithm is, in the context of the present patent application, and generally, is considered to be a self-consistent sequence of operations and/or similar signal processing leading to a desired result. In the context of the present patent application, operations and/or processing involve physical manipulation of physical quantities. Typically, although not necessarily, such quantities may take the form of electrical and/or magnetic signals and/or states capable of being stored, transferred, combined, compared, processed and/or otherwise manipulated, for example, as electronic signals and/or states making up components of various forms of digital content, such as signal measurements, text, images, video, audio, etc.

It has proven convenient at times, principally for reasons of common usage, to refer to such physical signals and/or physical states as bits, values, elements, parameters, symbols, characters, terms, samples, observations, weights, numbers, numerals, measurements, content and/or the like. It should be understood, however, that all of these and/or similar terms are to be associated with appropriate physical quantities and are merely convenient labels. Unless specifically stated otherwise, as apparent from the preceding discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically in the form of physical electronic and/or magnetic quantities, within memories, registers, and/or other storage devices, processing devices, and/or display devices of the special purpose computer and/or similar special purpose computing and/or network device. In the context of this particular patent application, as mentioned, the term "specific apparatus" therefore includes a general purpose computing and/or network device, such as a general purpose computer, once it is programmed to perform particular functions, such as pursuant to program software instructions.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation. Likewise, a physical change may comprise a transformation in molecular structure, such as from crystalline form to amorphous form or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state from a binary one to a binary zero or vice-versa in a memory device may comprise a transformation, such as a physical, but non-transitory, transformation. Rather, the foregoing is intended as illustrative examples.

Referring again to FIG. 8, processor 820 may comprise one or more circuits, such as digital circuits, to perform at least a portion of a computing procedure and/or process. By way of example, but not limitation, processor 820 may comprise one or more processors, such as controllers, microprocessors, microcontrollers, application specific integrated circuits, digital signal processors (DSPs), graphics processing units (GPUs), neural network processing units (NPUs), programmable logic devices, field programmable gate arrays, the like, or any combination thereof. In various implementations and/or embodiments, processor 820 may perform signal processing, typically substantially in accordance with fetched executable computer instructions, such as to manipulate signals and/or states, to construct signals and/or states, etc., with signals and/or states generated in such a manner to be communicated and/or stored in memory, for example.

FIG. 8 also illustrates device 804 as including a component 832 operable with input/output devices, for example, so that signals and/or states may be appropriately communicated between devices, such as device 804 and an input device and/or device 804 and an output device. A user may make use of an input device, such as a computer mouse, stylus, track ball, keyboard, and/or any other similar device capable of receiving user actions and/or motions as input signals. Likewise, for a device having speech to text capability, a user may speak to a device to generate input signals. A user may make use of an output device, such as a display, a printer, etc., and/or any other device capable of providing signals and/or generating stimuli for a user, such as visual stimuli, audio stimuli and/or other similar stimuli.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

What is claimed is:

1. A method comprising:
responsive to one or more signals received from a communication network, initiating via a service function forwarder a request to execute an instance of a first service function in a service function chain comprising an ordered sequence of service functions to be traversed;
determining in the service function forwarder a capability of a subsequent service function in the service function chain to be predictively executed;
initiating via the service function forwarder a request to execute an instance of the subsequent service function in the service function chain prior to receipt in the service function forwarder of a response to the request to execute the instance of the first service function responsive to the capability of the subsequent service function to be predictively executed; and
receiving in the service function forwarder the response to the request to execute the instance of the first service function and a separate response to the request to execute the instance of the first service function.

2. The method of claim 1, wherein initiating the request to execute the instance of the subsequent service function in the service function chain further comprises initiating the request to execute the instance of the subsequent service function responsive, at least in part, to one or more parameters specified in a signal packet received from the communication network.

3. The method of claim 2, wherein the one or more parameters are specified in a signal packet header.

4. The method of claim 2, wherein the one or more parameters are specified in a Network Service Header (NSH) formatted according to IETF RFC83000.

5. The method of claim 1, wherein initiation of the request to execute the instance of the subsequent service function is conditioned on attributes of received message traffic.

6. The method of claim 5, wherein the attributes of the received message traffic are determined based, at least in part, on a source IP address, destination IP address, source port identifier, destination port identifier or a protocol identifier, or a combination thereof.

7. The method of claim 1, wherein execution of the instance of the subsequent service function occurs at least partially currently with execution of the first service function.

8. The method of claim 1, wherein initiating the request to execute the instance of the subsequent service function comprises transmitting a request message, and wherein the method further comprises transmitting a message to revoke the request message responsive to receipt of a response message indicating a failure to execute the instance of the subsequent service function or a timeout condition.

9. A computing device, comprising:
a communication device to receive messages from a communication network; and
one or more processors to:

initiate via a service function forwarder a request to execute an instance of a first service function in a service function chain comprising an ordered sequence of service functions to be traversed responsive to one or more signals received at the communication device from the communication network;

determine in the service function forwarder a capability of a subsequent service function in the service function chain to be predictively executed;

initiate via the service function forwarder a request to execute an instance of a subsequent service function in the service function chain prior to receipt in the service function forwarder of a response to the request to execute the instance of the first service function responsive to the capability of the subsequent service function to be predictively executed; and receiving in the service function forwarder the response to the request to execute the instance of the first service function and a separate response to the request to execute the instance of the first service function.

10. The computing device of claim 9, wherein the request to execute the instance of the subsequent service function in the service function chain to be initiated responsive, at least in part, to one or more parameters specified in a signal packet received from the communication network.

11. The computing device of claim 10, wherein the one or more parameters are specified in a signal packet header.

12. The computing device of claim 10, wherein the one or more parameters are specified in a Network Service Header (NSH) formatted according to IETF RFC83000.

13. The computing device of claim 9, wherein initiation of the request to execute the instance of the subsequent service function to be conditioned on attributes of received message traffic.

14. The computing device of claim 13, wherein the attributes of the received message traffic to be determined based, at least in part, on a source IP address, destination IP address, source port identifier, destination port identifier or a protocol identifier, or a combination thereof.

15. The computing device of claim 9, wherein execution of the instance of the subsequent service function to occur at least partially currently with execution of the first service function.

16. The computing device of claim 9, wherein the request to execute the instance of the subsequent service function to be initiated by transmission of a request message, and wherein the one or more processors are further to initiated transmission of a message through the communication device to revoke the request message responsive to receipt of a response message indicating a failure to execute the instance of the subsequent service function or a timeout condition.

17. An article comprising:
a storage medium comprising computer-readable instructions stored thereon which are executable by one or more processors of a computing device to:

initiate a request to execute via a service function forwarder an instance of a first service function in a service function chain comprising an ordered sequence of service functions to be traversed responsive to one or more signals received from a communication network;

determine in the service function forwarder a capability of a subsequent service function in the service function chain to be predictively executed;

initiate a request to execute via the service function forwarder an instance of a subsequent service function in the service function chain prior to receipt in the service function forwarder of a response to the request to execute the instance of the first service function responsive to the capability of the subsequent service function to be predictively executed; and receiving in the service function forwarder the response to the request to execute the instance of the first service function and a separate response to the request to execute the instance of the first service function.

18. The article of claim 17, wherein the computer-readable instructions are further executable by the one or more processors to initiate the request to execute the instance of the subsequent service function responsive, at least in part, to one or more parameters specified in a signal packet received from the communication network.

19. The article of claim 17, wherein initiation of the request to execute the instance of the subsequent service function to be conditioned on attributes of received message traffic.

20. The article of claim 19, wherein the attributes of the received message traffic are determined based, at least in part, on a source IP address, destination IP address, source port identifier, destination port identifier or a protocol identifier, or a combination thereof.

* * * * *